United States Patent
Gronemeyer et al.

(10) Patent No.: US 7,555,683 B2
(45) Date of Patent: Jun. 30, 2009

(54) INVENTORY DETERMINATION FOR FACILITATING COMMERCIAL TRANSACTIONS DURING DIAGNOSTIC TESTS

(75) Inventors: Cary E. Gronemeyer, W. Jordan, UT (US); Kent J. Diamond, Highland, UT (US)

(73) Assignee: LANDesk Software, Inc., South Jordan, UT (US)

( * ) Notice: Subject to any disclaimer, the term of this patent is extended or adjusted under 35 U.S.C. 154(b) by 1435 days.

(21) Appl. No.: 10/198,031

(22) Filed: Jul. 17, 2002

(65) Prior Publication Data

US 2002/0184118 A1 Dec. 5, 2002

Related U.S. Application Data

(63) Continuation of application No. 09/468,963, filed on Dec. 21, 1999, now Pat. No. 6,363,359.

(51) Int. Cl.
*G06F 11/00* (2006.01)
*G06F 15/16* (2006.01)
*G06Q 10/00* (2006.01)

(52) U.S. Cl. .................. 714/55; 714/25; 714/36; 714/38; 714/26; 714/31; 709/219; 705/28

(58) Field of Classification Search ................ None
See application file for complete search history.

(56) References Cited

U.S. PATENT DOCUMENTS

| 5,019,963 | A | | 5/1991 | Alderson et al. | |
|---|---|---|---|---|---|
| 5,473,772 | A | | 12/1995 | Halliwell et al. | |
| 5,588,111 | A | * | 12/1996 | Cutts et al. | 714/9 |
| 5,752,042 | A | * | 5/1998 | Cole et al. | 717/173 |
| 5,923,834 | A | * | 7/1999 | Thieret et al. | 714/25 |
| 5,983,364 | A | * | 11/1999 | Bortcosh et al. | 714/25 |
| 6,035,420 | A | * | 3/2000 | Liu et al. | 714/25 |
| 6,091,737 | A | * | 7/2000 | Hong et al. | 370/431 |
| 6,263,452 | B1 | * | 7/2001 | Jewett et al. | 714/9 |
| 6,381,694 | B1 | * | 4/2002 | Yen | 713/2 |
| 6,560,726 | B1 | * | 5/2003 | Vrhel et al. | 714/55 |
| 6,715,067 | B1 | * | 3/2004 | Rhoads et al. | 713/1 |
| 6,807,643 | B2 | * | 10/2004 | Eckardt et al. | 714/36 |
| 6,948,099 | B1 | * | 9/2005 | Tallam | 714/38 |

OTHER PUBLICATIONS

Home Office Computing, "Keeping PC Problems at Bay," vol. 17, Issue 9, Sep. 1999.
McAfee.com- Press Release, "The Place for Your PC," Apr. 1999.

(Continued)

*Primary Examiner*—F. Zeender
*Assistant Examiner*—Mussa Shaawat
(74) *Attorney, Agent, or Firm*—Austin Rapp & Hardman

(57) ABSTRACT

The invention provides for facilitating e-commerce transactions between a client and a server over a network. In particular, a client, such as a client computing device, can perform a diagnostic test, such as a power-on self-test, and determine during the test any goods requiring replacement (e.g., acquiring a substitute good, repair, or upgrade). The client may then contact a server, such as a vendor or a technical support department, for procuring such replacement. In one embodiment, the server sends the client diagnostic commands so as to allow remote diagnosis of operability of the client.

16 Claims, 4 Drawing Sheets

OTHER PUBLICATIONS

Network World, "Does Your Windows Net Need A Physical?", vol. 14, Issue 11, Mar. 1997.

Infotech Update, "Give Your Computer A Complete Physical Using Oil Change and First Aid," vol. 6, Issue 3, May/Jun. 1997.

Inside the Internet, "Playing Catch-Up," vol. 5, Issue 10, Oct. 1998.

PC Magazine, "First-Rate Updates," pp. 66, Apr. 1999.

* cited by examiner

INVENTORY DETERMINATION FOR FACILITATING COMMERCIAL TRANSACTIONS DURING DIAGNOSTIC TESTS

RELATED APPLICATIONS

This application is a continuation of patent application Ser. No. 09/468,963, filed on Dec. 21, 1999 now U.S. Pat. No. 6,369,359, entitled "Inventory Determination for Facilitating Commercial Transactions").

FIELD OF THE INVENTION

The invention generally relates to offering goods and services for sale based on an automatic detection of a client's configuration, and more particularly, to performing a detailed power-on test inspection of the client's hardware and software configuration to determine updates for the client, and automatically take action.

BACKGROUND

In a typical sales environment, a buyer contacts (e.g., via the Internet, an intranet, extranet, world wide web, etc.) a goods or service provider (hereafter seller) seeking goods (e.g., hardware or software sales) or services (e.g., technical support or repairs). Even though the buyer usually has a general understanding of what the buyer wishes to purchase, sellers must still engage in often-lengthy dialogs with the buyer to validate the intended purchase, as well as to determine other goods or services that might be of interest to the buyer. As used herein and the claims that follow, the term "software" is intended to include software installed within hardware such as non-volatile memory, as well as within mass storage devices such as hard disks.

Such dialogues with the buyer are expensive in time and resources since the seller must provide people with whom the buyers interact. These expenses necessarily impact the prices at which the seller may provide the goods and services. In an effort to minimize these costs, sellers have developed various techniques for speeding up the sales process, and therefore minimizing the amount of time required for an operator to aid a buyer. Speeding up time spent with the buyer allows the seller to amortize the seller's fixed costs (e.g., salary, rent, etc. for the agents) across multiple buyers. One obvious improvement has been to computerize the sales process, and allow a seller to search online databases of the seller's products. Another improvement has been to provide cross-references in the database between the buyer's intended purchase and other related purchases, allowing the seller to suggest purchasing the related products. Other improvements have been made as well.

But, one element remaining in these improvements is the presence of a human operator with which the buyer interacts. Thus, even though techniques may be applied to distribute operator-related fixed costs among multiple buyers, the fixed costs have not been avoided.

A related problem is that when a buyer seeks to repair a computing device that fails a test, such as a power-on self-test (POST), it can be particularly difficult to identify computing device components (e.g., installed goods) requiring repair or replacement if the computing device cannot be brought to some minimal functionality. In such circumstances, it would be beneficial to arrange for such replacement during execution of the test itself.

SUMMARY

In one embodiment, a method for procuring goods or services during a test of a client. A test of the client is initiated, and a good of the client requiring replacement is determined. A server is contacted over a network, and the replacement for the good is procured from the server.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Figure 1:
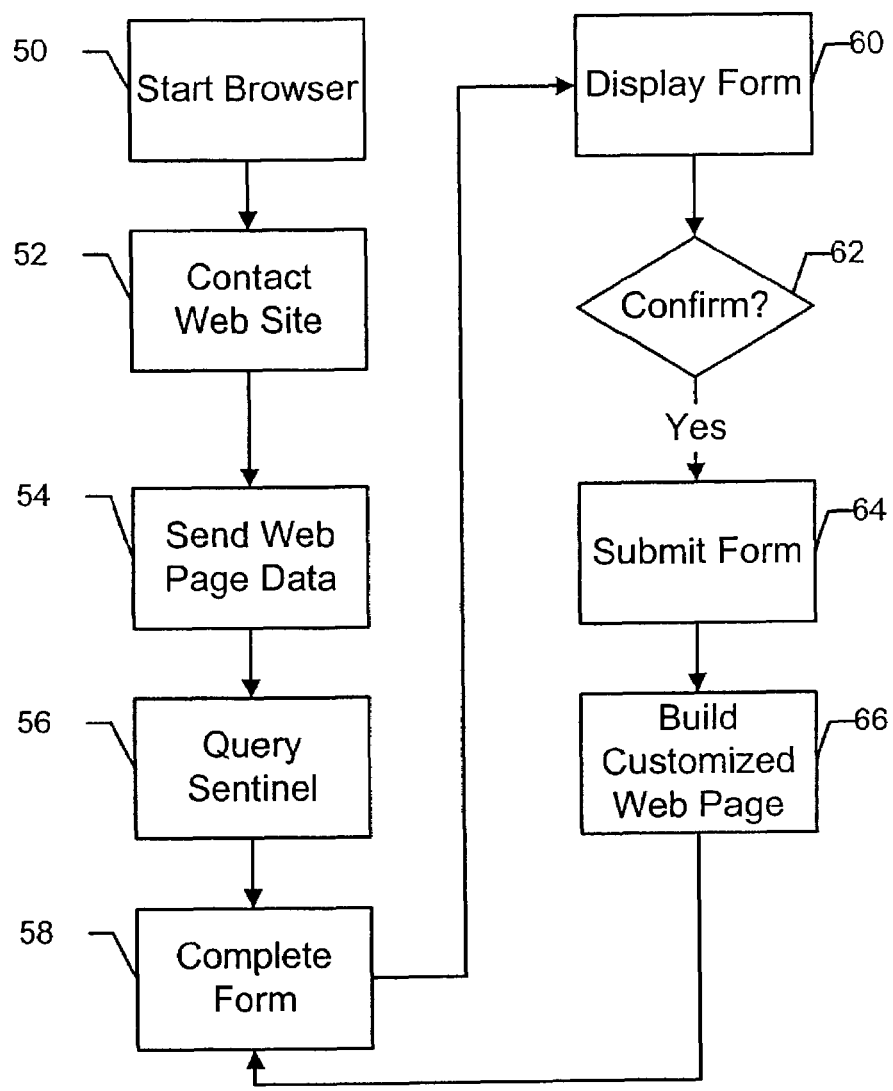
FIG. 1 illustrates a software-based embodiment for inspecting a client computing device for procurement of goods or services.

FIG. 1 illustrates a software-based embodiment for procuring goods or services for a client computing device. As illustrated, a first operation is to start a client web browser 50 (e.g., Microsoft Internet Explorer, Netscape Navigator, and the like). The web browser is executing on a client computing device, such as a conventional computer, hand-held device (e.g., Microsoft Windows CE based devices), personal digital assistant (PDA), telephone, or the like.

The client web browser is directed to contact 52 a web site of a provider of goods or services. Typically, such direction is by way of a user entering an address in an address bar for the browser, by clicking on a link (e.g., a hypertext-transport protocol (HTTP) link such as "http://www.someserver-.com"), or by navigating through a provider's web site. (As will discussed below, as a user navigates a web site, the web server can provide targeted web pages according to the characteristics of the user's computing device.)

In response to the contacting, the web server sends 54 the client web browser hypertext markup language (HTML) page data that includes embedded code to query a sentinel. In one embodiment, the sentinel is implemented as a common object model (COM) type of object (or equivalent object, e.g., a Netscape plug-in) that resides on the client. The embedded code can be JavaScript, Java, visual basic, a Java applet (machine independent), or other coding formats capable of being embedded into a web page and interact with the sentinel (e.g., such as by scripting). A sentinel is responsible for inspecting the client computing device and determining needed goods or services based on the configuration of the client computing device. Determining can include identifying needed replacements for existing hardware and/or software, as well as suggesting procurement of hardware or software based on currently installed products or past purchase decisions.

It is assumed that the sentinel is installed and ready to interact with embedded web page code. If it is not already installed, as with other web browser helper-type applications, file viewers, and updated compression/decompression (CO- DEC) systems, an attempt by the embedded code to access the sentinel object will cause the sentinel object to be loaded within the client computing device if it is not already installed. Typically such installation takes the form of displaying a confirmation box to a user, indicating that a required tool is missing for properly displaying the requested web page, with a request that the user authorize the downloading and installation of the sentinel. Installation includes writing the sentinel into mass storage devices such as a hard disk of a computer, or into volatile or non-volatile program memory of a personal digital assistant (PDA) type of device (e.g., Palm Pilot, Apple Newton, Windows CE devices, etc.). If a user elects not to install the sentinel object, or if a local policy forbids such installations, then the embedded code is ignored by the client web browser.

The embedded code then queries 56 the sentinel regarding particular characteristics of the client computing device. The particular query made is dependent on which web page the client requested from the web server. Thus, for example, if the web browser was retrieving a web page concerning hard drives, the embedded code (e.g., JavaScript or other code) may query the sentinel to determine client computing device characteristics that are relevant to whether the client computing device needs a new hard drive.

In one embodiment, the sentinel object has a number of known defined scriptable methods which are used to communicate with the sentinel, and queries 56 use the methods to extract information about the client computing device. Using the methods causes internal programming of the object to be executed by the client computing device. Thus, for determining whether a client computing device, the embedded code might execute a commands such as "sentinel.numberOfHardDrives", "sentinel.hardDriveCapacity", "sentinel.maxAvailableStorageSpace, or other commands designed to facilitate a provider's determination of whether to offer certain goods or services related to the web page retrieved by the client web browser. In another embodiment, the sentinel has a known method for querying what other methods the sentinel supports; this allows preparing web page code that can adapt at run-time to particular sentinel configurations.

In one embodiment, to comport with security models applied by web browsers, rather than effecting a direct transmission of the sentinel-collected information to the web server, instead an HTML form is completed 58 by filling in the form with the sentinel-collected data. In one embodiment, the collected data is associated with form fields, and the form displayed 60 by the client web browser. (If the form is not displayed, hidden form fields can be used.) In this embodiment, the form is configured as an authorization request form which requests confirmation by a user of submitting the form and associated sentinel-collected information to the web server. If 62 the form is confirmed (e.g., by clicking a "Submit" button on the form), the form is then submitted 64 to the web server. If the form is not confirmed, then an error handler (not shown) can be invoked. Alternatively, the client-server dialog may proceed without sentinel enhancements.

This form submission technique is also suitable for diagnosing problems with computing devices. For example, a user of the client computing device could navigate to a technical support page, where the support page includes embedded code to query the client computing device about its configuration (e.g., storage configuration, memory configuration, operating system, etc.). With a click of a form submission button, this sentinel-collected data can be forwarded to a technical services department to open a support ticket or take other support action. Multiple web pages can also be configured so as to step a client through a diagnosis (e.g., troubleshooting) session, where progressing through each web page causes client configuration data relevant to a particular diagnostic step to be sent. A final web page may be displayed of client identified configuration data and allow for entering (e.g., by a user) of additional relevant facts or context surrounding the problem.

In another embodiment, rather than hiding the sentinel-collected information, the data is presented to a user of the client computing device for review. In a further embodiment, the user is also given opportunity to elect what (if any) information is sent back to the web server. This can be effected by way of modifying the form, such as by clearing check boxes, or through general configuration options of the sentinel regarding types of information to submit.

In one embodiment, the form is pre-defined and embedded within the HTML code for the selected web server page, along with the embedded code for accessing the sentinel object, and other page description data. In an alternate embodiment, the form is prepared locally by the sentinel, and then loaded within a browser window. The window to contain the form may be the presently-being-viewed browser window, or a new (e.g., pop-up) window directed to load the form. One skilled in the art will recognize there is a variety of different techniques for causing a web browser to load a particular form and its contents.

In one embodiment, when a new web server which makes use of embedded sentinel code is first contacted, a user of the client computing device is presented with a general authorization (e.g., "trust") request from the new web server. This general authorization request asks the user to authorize future direct submission of sentinel-collected data without future user intervention. Other arrangements for providing for trusting a particular web server, such as certificate-based authorization checking, are also contemplated.

On receiving the submitted 64 sentinel-collected data, the web server then builds 66 a web page that is customized according to the characteristics of the client computing device. Thus, for example, if a provider currently has a close-out sale on a particular product, the provider may embed sentinel requests to confirm that the client computing device is capable (or in need) of receiving the sale item; if so, the generated web page can contain an advertisement regarding the sale item.

This sentinel-collection and web page generation process repeats as a user navigates a web site. And, a provider may choose to configure all web pages with embedded code for interacting with the sentinel, or only certain pages as desired. Pages without embedded sentinel-related code will simply load as normal within a web browser.

Note that the above description assumes that the results of the sentinel inspection are sent back to the web server for dynamic generation of web pages. This is not necessary. Instead, a server may embed scripts (e.g., JavaScript or equivalent) within a web page that are designed to respond according to the sentinel-collected data. For example, if a user were visiting a web page regarding printer supplies, the script may call a "sentinel.hasColorPrinter" method, and if it returns true, then cause a color cartridge advertisement to appear. In this configuration, no information is transmitted back to the web page server. Such conditional scripting can also be used to conditionally load particular web pages based on the results of the sentinel inspection.

Figure 2:
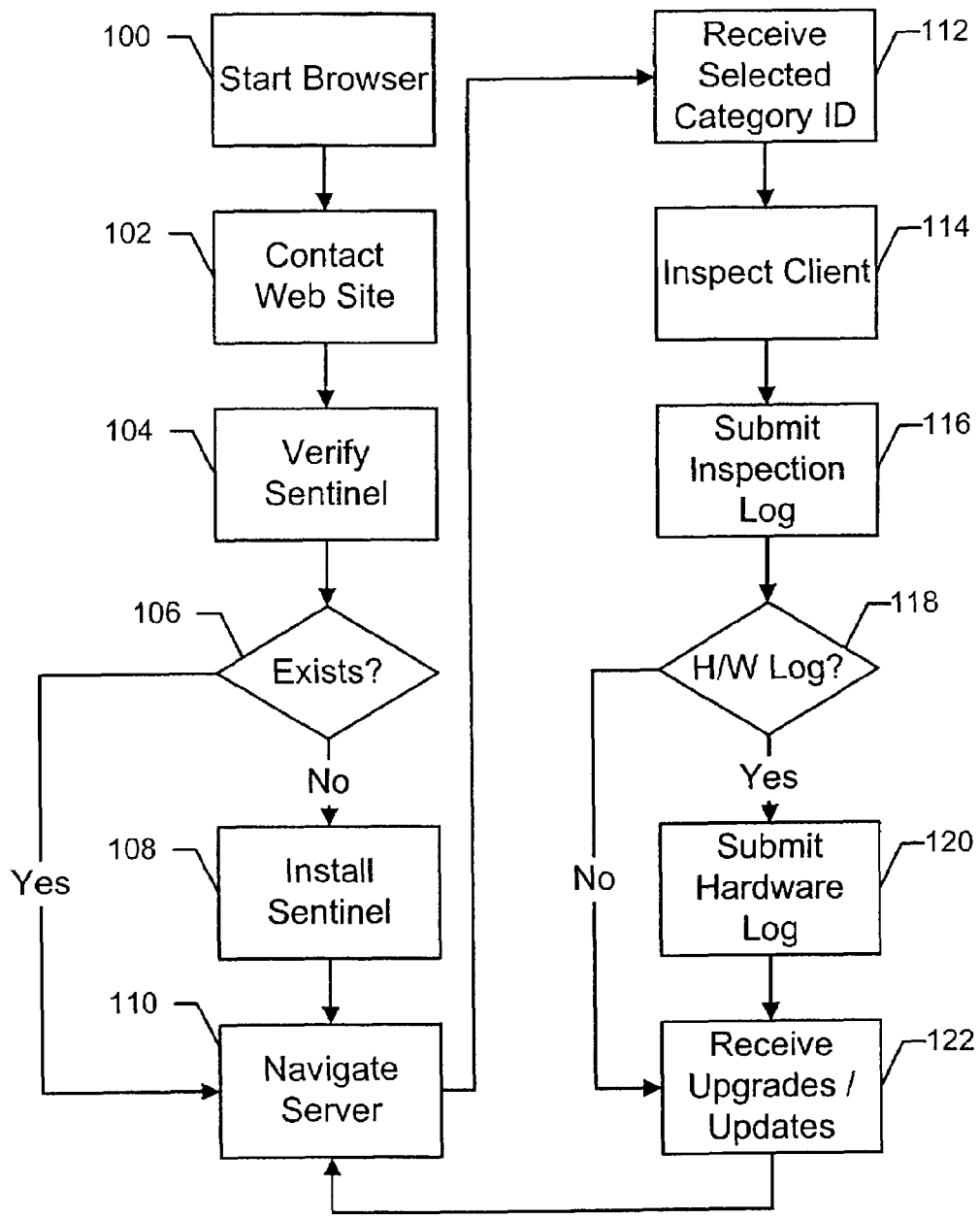
FIG. 2 illustrates another software-based embodiment for inspecting the client computing device for procurement of goods or services.

FIG. 2 illustrates another software-based embodiment for procuring goods or services for a client computing device, where the sentinel controls the communication process with a web server.

As illustrated, a first operation is to start a web browser 100. The browser is configured to operate with a locally installed sentinel application program described above. After starting the browser, a sentinel enabled web site is contacted 102.

In this embodiment, determining which sites are sentinel enabled site may be by way of several conventional methods. One is to select the site from a list of known compatible sites, such as a corporation's internal web server, a web server of an outside (third-party) support agency. A listing of known sites can be installed along with installing the sentinel software, or downloaded and/or updated from a dedicated web site maintained by the sentinel provider. A listing of known sites may also be derived from performing an Internet search, as discussed below, by using the client computing device configuration as search terms.

After contacting 102 the server, the server attempts to verify 104 whether the contacting client computing device has an existing 106/ installed sentinel. If the sentinel is not already installed, it is downloaded from the server, and installed 108.

In one embodiment, verifying 104 sentinel installation is achieved by sending a particular code sequence to the client computing device web browser. Per normal web browser convention, the particular code sequence is ignored unless there is a browser component design to receive and process the code sequence. Thus, if a sentinel is installed within the client computing device, it receives and responds to the server's verification attempt. In another embodiment, loading the server's web page causes an Active/X or equivalent control to execute on the client computing device, where this control inspects the client computing device for an installed sentinel.

In another embodiment, the verification is by way of redirecting the client browser to a uniform resource locator (URL) address that attempts to download the sentinel to the client computing device. In this embodiment, if the sentinel is already installed, then the download operation is cancelled. If the sentinel is not already installed, then the download completes and the sentinel is installed on the client computing device.

After installation, the sentinel monitors a client computing device's web browser navigation 110 of the server's web site. In this embodiment, it is assumed that the server has its goods and wares separated into different categories. As each server category is selected for viewing in the web browser, the server sends an indicator of the server's currently selected category (e.g., an identifier indicating the browser is viewing video adapters, monitors, mass storage, etc.) to the client computing device. This identifier is received 112 by the sentinel. The Sentinel then inspects 114 the client computing device for hardware or software related to the selected server category.

This sentinel's inspection results in a log file of currently installed hardware and software related to the selected server category. The log is then submitted 116 to the server. In one embodiment, the log only contains information related to the selected server category. In another embodiment, the log contains data about all client hardware and software, but only a relevant portion is submitted to the server. In another embodiment, the entire log of all hardware and software is submitted to the server.

In an alternate embodiment, rather than preparing a log file as the server's web site is traversed, instead an operating system log of hardware and software within the computing device is used. An example of such a log is the log (and associated registry keys) produced by Microsoft Windows NT each time the operating system is started. For systems not providing such a log, one embodiment of the invention performs a boot-time analysis so as to prepare a log equivalent to that of Windows NT. In another embodiment, a hardware-based sentinel determines a log of at least hardware installed within the client computing device (see FIG. 2). If 118 a hardware-based sentinel log is available, it is submitted 120 as is the inspection log, e.g., in its entirety, or partially, depending on configuration of the sentinel.

In response to receiving the client computing device's configuration information, the server sends 122 the client computing device information concerning available upgrades and updates for the client computing device.

In one embodiment, the server displays the available upgrades and updates in dynamically generates web pages targeted to the client computing device's needs. In another embodiment, the server provides a sub-section of a web page, e.g., a frame, table cell, screen region, etc., that is targeted to the client computing device's particular needs, and in another section, the server presents other sales or services offered by the server. This embodiment allows the client to receive partial web page data, where embedded therein can be the server category (e.g., context) identifier sent to the client. The targeted subsection is then filled in accordance with the submitted 116 hardware/software log and/or the submitted 120 hardware log. In this other section, the server can display items related to the client computing device's configuration.

For example, if a user of a client web browser selects a printer category of the server, the web page may be constructed to show general printer sales offers, and then if the configuration data submitted 116, 120 by the client indicates a color printer associated with the client computing device, the server may also propose targeted sales of color matching software, or graphic design software, or other hardware or software related to the identified color printer. In addition, the server may propose recommended or warn of hardware or software upgrades required for items identified in the log(s). Further, the server may also maintain a history of past purchases, and also provide a listing of predicted needed items (e.g., consumables or devices assumed to be at the end of their duty cycle).

As a user of the client computing device navigates about the server's web site, processing repeats with operation 110 as discussed above.

Figure 3:
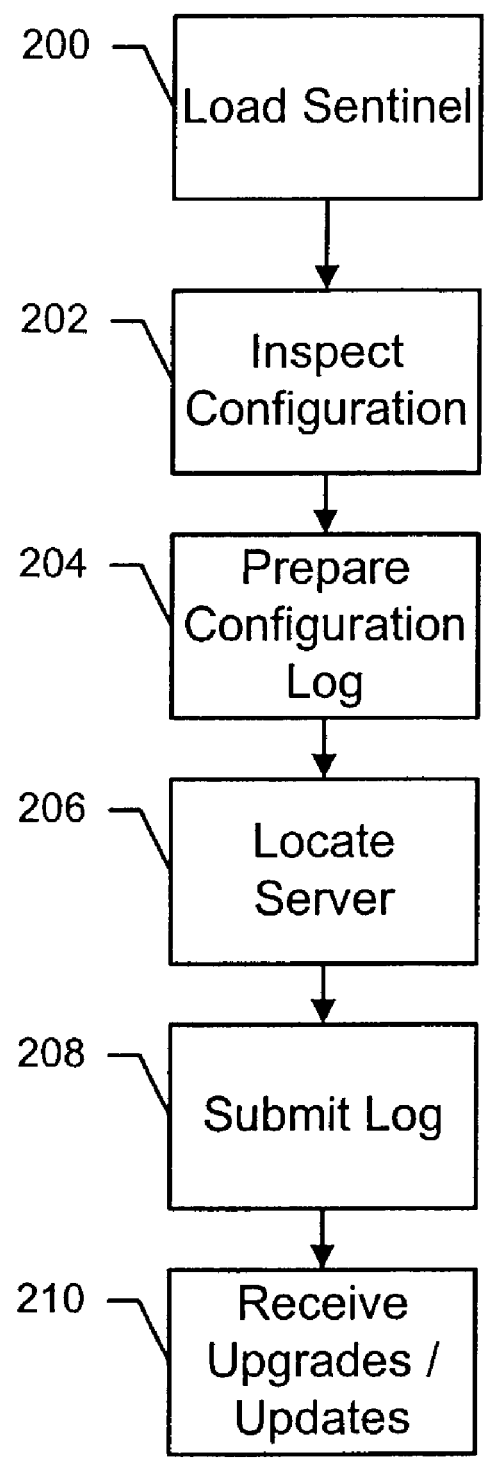
FIG. 3 illustrates a hardware-based embodiment for configuring a client computing device to automatically inspect itself for procuring goods or services.

FIG. 3 illustrates a hardware-based embodiment for configuring a client computing device to automatically inspect itself for procuring goods or services, such as repair or replacement of a failed or failing good (e.g., an installed component). Note that in this description and claims that follow, the term "replacement" is intended to include diagnosis, repair, and upgrading of a component. Choosing between repair, replacement or upgrading may be dictated by policy, pricing considerations, or circumstances (e.g., select replacement if a POST cannot complete).

As discussed above, the hardware embodiment may be used in conjunction with a software embodiment (e.g., FIG. 1). A hardware embodiment is also useful for operating system environments which prevent accurate access to and analysis of a computing device's hardware configuration. For example, Microsoft Windows NT interferes with inspection of hardware.

As illustrated, a first operation is to load a sentinel 200. It is assumed that the sentinel is loaded and executed during a power-on self-test (POST) of a computing device. For example, the sentinel may be installed as a boot-device so that during POST, control of the computing device temporarily transfers to the sentinel. This embodiment allows the sentinel to provide for diagnosing and ordering replacement parts for a computing device that cannot successfully complete the POST. However, it is understood that the sentinel may be activated by some other method, such as a config.sys file (as used in Microsoft DOS environments), Unix-type boot-initialization file, or the like; the only requirement is that the sentinel be loaded before access to hardware is diminished.

The sentinel may be incorporated into plug-in cards attached to a local bus (e.g., Peripheral Component Interconnect (PCI), Industry Standard Architecture (ISA), Personal Computer Memory Card International Association (PCMCIA or "PC Card"), etc.). The sentinel may also be incorporated into a computing device with an application specific integrated circuit (ASIC), as software in a non-volatile (NV) memory, or some combination of the two. Examples of NV memory include NV random access memory (NVRAM), flash read-only memory (ROM), electrically programmable ROM (EPROM), electrically erasable programmable ROM (EEPROM), and the like. (Note that if a client computing device has a program stored in non-updateable memory, the sentinel may nonetheless detect a needed upgrade and suggest a firmware upgrade.)

When the sentinel is loaded 200, it begins with an inspection 202 of the client computing device configuration, identifying hardware and software installed within the client computing device. A configuration log is prepared 204 of the inspection results, and stored in a memory associated with the sentinel. It is expected that the sentinel store its log in NVRAM for later review by other hardware or software devices (e.g., the FIG. 1 embodiment).

In one embodiment, after preparing the log, a server is located 206 (see also FIG. 3). For simplicity, it is assumed for this embodiment that the sentinel has a pre-existing list of servers to contact when there is a problem. However, as discussed with respect to FIG. 3, other techniques may be used to search for servers. It is assumed the sentinel has access to a network interface in communication with an intranet or other network (e.g., the Internet), and that the sentinel is configured to communicate with the network interface and contact a server without intervention.

In one embodiment, the sentinel uses an expert system (or equivalent artificial intelligence system) to coordinates communication with a server regarding procuring hardware and software. In one embodiment, the sentinel encompasses hypertext markup language (HTML) processing ability for interaction with a server via the hypertext transport protocol (HTTP). In one embodiment, the sentinel or the computing device (e.g., the sentinel's host) has a hardware-based Java virtual machine (or equivalent), and the sentinel is programmed in the Java programming language. One skilled in the art will recognize that the particular language and/or communication protocol is irrelevant so long as the sentinel can communicate with the network interface, locate a server, and coordinate procurement of goods or services.

The log is then submitted 208 to the server, and in response the server responds 210 with available sales and upgrades options for the items identified by the log. Depending on the configuration of the sentinel, the sentinel may be programmed to instruct the server to ship some or all of the available sales and upgrades. The sentinel stores the detection log, server response, and order requests in a memory associated with the sentinel for later review after completing the POST.

In one embodiment, the sentinel locates and contacts a server only when there is a problem during the POST. For example, if there is an identified problem, such as a memory failure, hard disk failure, etc., that prevents the client computing device from completing the POST, the sentinel attempts to arrange for goods or services required to diagnose and/or fix the problem. For example, a contacted server may be a repair group located on a local network (e.g., a corporate Information Technology department), or a repair facility located on the Internet (e.g., third-party technical support), or some other server located through a search on the Internet. The repair group may receive a connection from the sentinel, and respond with diagnostic tests and/or commands. In one embodiment, the sentinel is configured to receive and act on requests to run hardware diagnostic systems such as Intel LANDesk, or other diagnostic systems embedded within the computing device.

Figure 4:
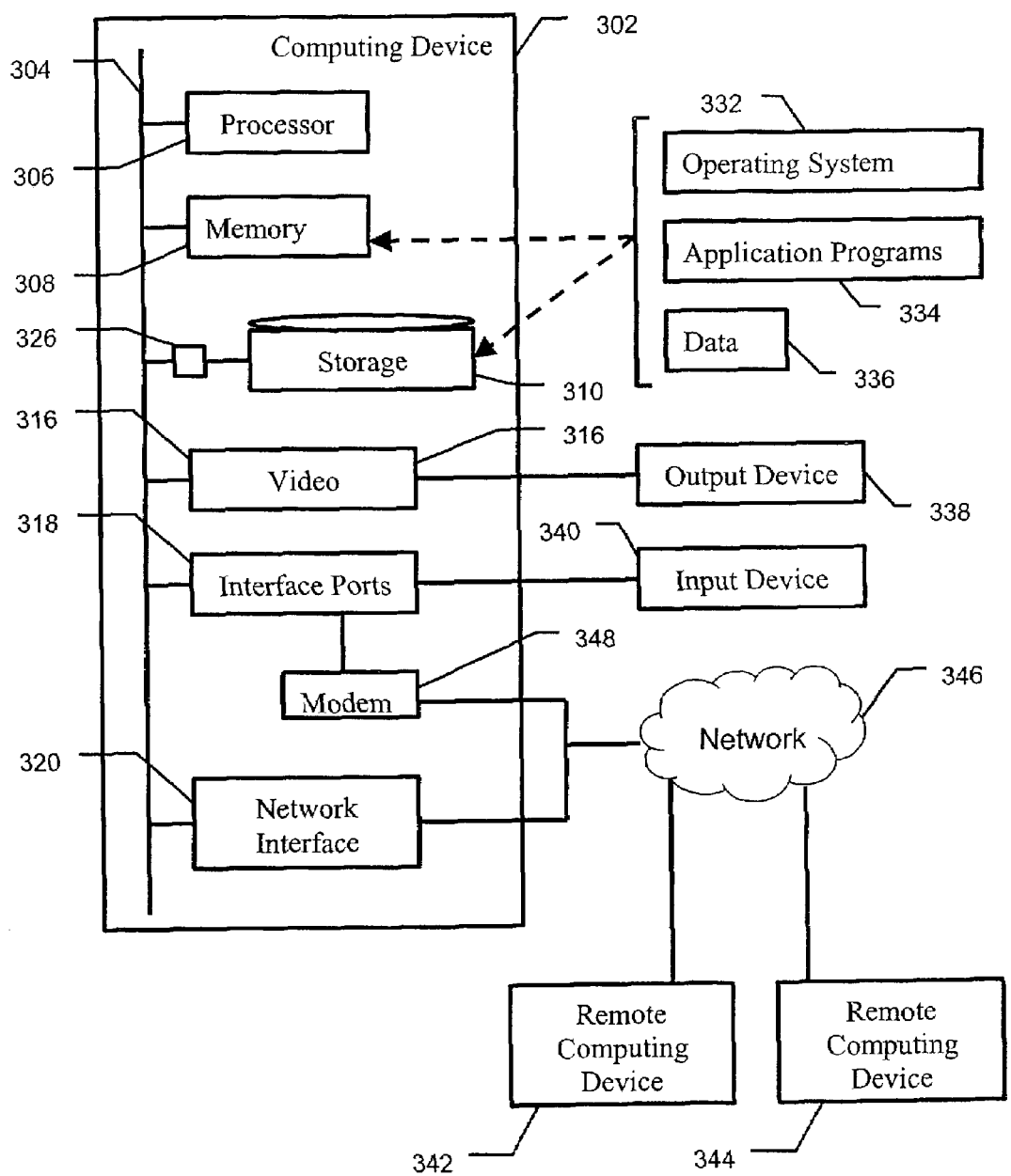
FIG. 4 illustrates a suitable computing environment in which certain aspects of the claimed invention may be practiced.

FIG. 4 illustrates a suitable computing environment in which certain aspects of the claimed invention may be practiced. The figure and following discussion are intended to provide a brief, general description of a suitable computing environment in which portions of the invention may be implemented. The invention may be described by reference to different high-level program modules and/or low-level hardware contexts (e.g., FIGS. 1, 2). Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing devices, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices.

An exemplary system for implementing the client computing devices discussed above includes a computing device 302 having system bus 304 for coupling together various components within the computing device. The system 304 bus may be any of several types of bus structures, such as PCI, AGP, VESA, Microchannel, ISA and EISA, etc. Typically, attached to the bus 302 are processors 306 such as Intel, DEC Alpha, PowerPC, programmable gate arrays, etc., a memory 308 (volatile and non-volatile memory such as RAM, ROM, NVRAM, etc.), storage devices 310, a video interface 316 for presenting output to an output device 338, input/output interface ports 318 for communicating with input devices 340 or other devices, and a network interface 320. The storage systems and associated computer-readable media provide storage of data and executable instructions for the computing device 302, and may be attached to the bus 304 by way of a bus interface 326. Note that storage options include storage formats such as hard-drives, floppy-disks, optical storage, magnetic cassettes, tapes, flash memory cards, memory sticks, digital video disks, biological-based storage, and the like.

The exemplary computing device 302 can store and execute a number of program modules within the memory and storage devices 310, and manipulate data 336. Typical program modules include an operating system 332 (e.g., Unix variants, Macintosh, Microsoft, Palm OS, BeOS, etc.), and application programs 334, such as, a web browser configured to interact with a provider of goods or services. The program modules may be implemented as ASICs to provide for power-on self-test (POST) based processing, diagnosis, and procurement of needed goods and services (if necessary) if the computing cannot complete a POST.

Computing device 302 may be a computer or other intelligent device, such as routers and switches, in addition to consumer devices such as telephones, radios, appliances, etc.

The computing device 302 is expected to operate in a networked 346 environment using logical connections to one or more remote computing devices, where remote computing devices 342, 344 can be configured as having some or all of the features of computing device 302. It is understood that a modem 348 may also be used to form network connections. Assuming a viewpoint of computing device 302 operating a sentinel, then remote computing devices 342, 344 include remote network servers and other devices utilizing network application protocols such as HTTP (e.g., web servers), File Transfer Protocol (FTP), Gopher, Wide Area Information Server (WAIS), and the like. It will be appreciated that computing devices 302, 342, 344 may be embodied as single devices, or as a combination or separate components. For example, computing device 302 may have an external input/output interface (e.g., a local area network (LAN) network interface) for communicating with remote devices.

Having described and illustrated the principles of the invention with reference to illustrated embodiments, it will be recognized that the illustrated embodiments can be modified in arrangement and detail without departing from such principles. For example, while the foregoing description focused—for expository convenience—on procurement of goods or services, it will be recognized that the same techniques and analyses discussed above can be applied to other transactions requiring detailed information about a client computing device. For example, although not covered in detail herein, detailed client computing device information can form the basis of remote testing and diagnosis of failing client computing device components. The sentinel can then be used to order new components from available servers.

Even though the foregoing discussion has focused on particular embodiments, it is understood that other configurations are contemplated. In particular, even though expressions such as "in one embodiment", "in another embodiment", and the like are used herein, these phrases are meant to generally reference embodiment possibilities, and are not intended to limit the invention to those particular embodiments. Unless indicated otherwise, some or all of different indicated embodiments may be combined. Consequently, in view of the wide variety of permutations to the above-described embodiments, the detailed description is intended to be illustrative only, and should not be taken as limiting the scope of the invention.

What is claimed as the invention, is all such modifications as may come within the scope and spirit of the following claims and equivalents thereto.

The invention claimed is:

1. A method for procuring goods or services during a test of a client, comprising:
   loading, during a power-on self-test, a sentinel on the client computing device;
   inspecting, during a power-on self-test, the client for goods requiring replacement, wherein the goods comprise hardware or software, wherein the inspecting comprises the sentinel identifying hardware or software installed on the client and identifying any failed goods;
   preparing, during a power-on self-test, a configuration log of inspection results;
   storing the configuration log at the client;
   submitting, during a power-on self-test, the configuration log to a server in response to identifying a failed good;
   receiving, during a power-on self-test, a response from the server based on the configuration log, the response comprising available sales options for the failed good; and
   instructing, during a power-on self-test, the server to ship goods replacing or repairing the failed good, wherein the instructing is performed by the sentinel.

2. The method of claim 1, further comprising:
   exiting an operating system for the client before loading the sentinel.

3. The method of claim 1, further comprising;
   using an expert system for said submitting, receiving, and instructing;
   wherein the expert system is configured to communicate with the server over the network for said instructing.

4. The method of claim 3, wherein said inspecting includes identifying a duty cycle for the good requiring replacement, such that the good requires replacement when at the end of its duty cycle.

5. The method of claim 1, wherein said inspecting includes identifying a duty cycle for the good requiring replacement, such that the good requires replacement when at the end of its duty cycle.

6. The method of claim 1, further comprising: receiving one or more remote diagnostic commands; and
   executing said remote diagnostic commands so as to allow the server to analyze operability of the client.

7. The method of claim 6, wherein said remote diagnostic commands are requests to run diagnostic systems embedded within the computing device.

8. The method of claim 1, further comprising:
   using an expert system configured to utilize hypertext markup language (HTML) to communicate with the server over the network for said instructing.

9. A readable medium having instructions encoded thereon executed by a processor to:
   load, during a power-on self-test, a sentinel on the client computing device;
   inspect, during a power-on self-test, the client for goods requiring replacement, wherein the goods comprise hardware or software, wherein the inspecting comprises the sentinel identifying hardware or software installed on the client and identifying any failed goods;
   prepare, during a power-on self-test, a configuration log of inspection results;
   store the configuration log at the client;
   submit, during a power-on self-test, the configuration log to a server in response to identifying a failed good;
   receive, during a power-on self-test, a response from the server based on the configuration log, the response comprising available sales options for the failed good; and
   instruct, during a power-on self-test, the server to ship goods replacing or repairing the failed good.

10. The readable medium of claim 9, wherein the test is performed while an operating system for the client computing device is inactive.

11. The readable medium of claim 9, said instructions including further instructions for an expert system configured to inspect operability of the client computing device and communicate over the network to instruct the server to ship the good.

12. The readable medium of claim 11, said expert system instructions including further instructions for identifying a duty cycle for the good requiring replacement, so that the expert system instructs the server to ship the good if it is at the end of its duty cycle.

13. The readable medium of claim 9, said instructions including further instructions for identifying a duty cycle for the good requiring replacement, such that the server is instructed to ship the good if it is at the end of its duty cycle.

14. The readable medium of claim 9, said instructions including further instructions executed by the processor to:
  receive one or more remote diagnostic commands; and
  execute said remote diagnostic commands so as to allow the server to analyze operability of the client computing device.

15. The method of claim 14, wherein said remote diagnostic commands are requests to run diagnostic systems embedded within the computing device.

16. The readable medium of claim 9, said instructions including further instructions executed by the processor to:
  execute an expert system configured to utilize hypertext markup language (HTML) to communicate with the server over the network to instruct the server to ship said good.

* * * * *